United States Patent [19]
Kato

[11] Patent Number: 6,055,883
[45] Date of Patent: May 2, 2000

[54] SUPPORTING STRUCTURE OF A PEDAL DEVICE FOR A VEHICLE

[75] Inventor: Yoshihisa Kato, Nishikamogun, Japan

[73] Assignee: Toyota Jidosha Kabushiki Kaisha, Toyota, Japan

[21] Appl. No.: 08/845,480

[22] Filed: Apr. 25, 1997

[30] Foreign Application Priority Data

Apr. 30, 1996 [JP] Japan .................................. 8-109777

[51] Int. Cl.⁷ .................................................. G05G 1/14
[52] U.S. Cl. .............................. 74/512; 74/560; 180/274
[58] Field of Search ........................... 74/512, 518, 560, 74/513, 517, 519; 180/274, 275, 784; 296/189

[56] References Cited

U.S. PATENT DOCUMENTS

| | | | |
|---|---|---|---|
| 2,129,851 | 9/1938 | Lee | 74/512 X |
| 2,869,392 | 1/1959 | Muller | 74/512 |
| 3,199,367 | 8/1965 | Zetye | 74/512 |
| 3,774,471 | 11/1973 | Pezza | 74/560 |
| 3,828,625 | 8/1974 | Bruhn | 74/512 |
| 4,426,890 | 1/1984 | Hansen | 74/512 X |
| 4,907,468 | 3/1990 | Hagiwara et al. | 74/512 |
| 5,555,774 | 9/1996 | Lauring et al. | 74/512 |
| 5,615,749 | 4/1997 | Sako | 180/274 |
| 5,848,558 | 12/1998 | Isono et al. | 74/512 |
| 5,848,662 | 12/1998 | Sakaue | 180/274 |

FOREIGN PATENT DOCUMENTS

| | | | |
|---|---|---|---|
| 39 04 616 | 8/1989 | Germany . | |
| 56-163973 | 12/1981 | Japan | 180/274 |
| 1-73464 U | 5/1989 | Japan . | |
| 6-211115 | 8/1994 | Japan | 74/512 |

*Primary Examiner*—Vinh T. Luong
*Attorney, Agent, or Firm*—Oliff & Berridge, PLC

[57] ABSTRACT

A supporting structure of a pedal device for a vehicle, comprising: a pedal bracket fixed to a vehicle body so as to support a rotating shaft portion of a suspended type pedal device for a vehicle; and a displacement controlling device coupled to a rear end portion of the pedal bracket so as to control the displacement of a stepping surface of the pedal device for a vehicle as a result of displacement of the displacement controlling device substantially in a downward direction of the vehicle by an external force of a predetermined value or greater which is applied to a front portion of the vehicle.

17 Claims, 10 Drawing Sheets

SUPPORTING STRUCTURE OF A PEDAL DEVICE FOR A VEHICLE

BACKGROUND OF THE INVENTION

1. Field of the Invention

The present invention relates to a supporting structure of a pedal device for a vehicle.

2. Description of the Related Art

Hitherto, various structures have been devised as countermeasures at the time an external force of a predetermined value or greater is applied from the front of a vehicle. As examples of this type of countermeasures, it is possible to cite the structures disclosed in DE 3904616 in which a pedal bracket is deformed in a downward direction of a vehicle and Japanese Patent Utility Model Application Laid-Open (JP-U) No. 1-73464. Hereafter, a brief description will be given of the structure disclosed in Japanese Patent Utility Model Application Laid-Open (JP-U) No. 1-73464.

Figure 8:
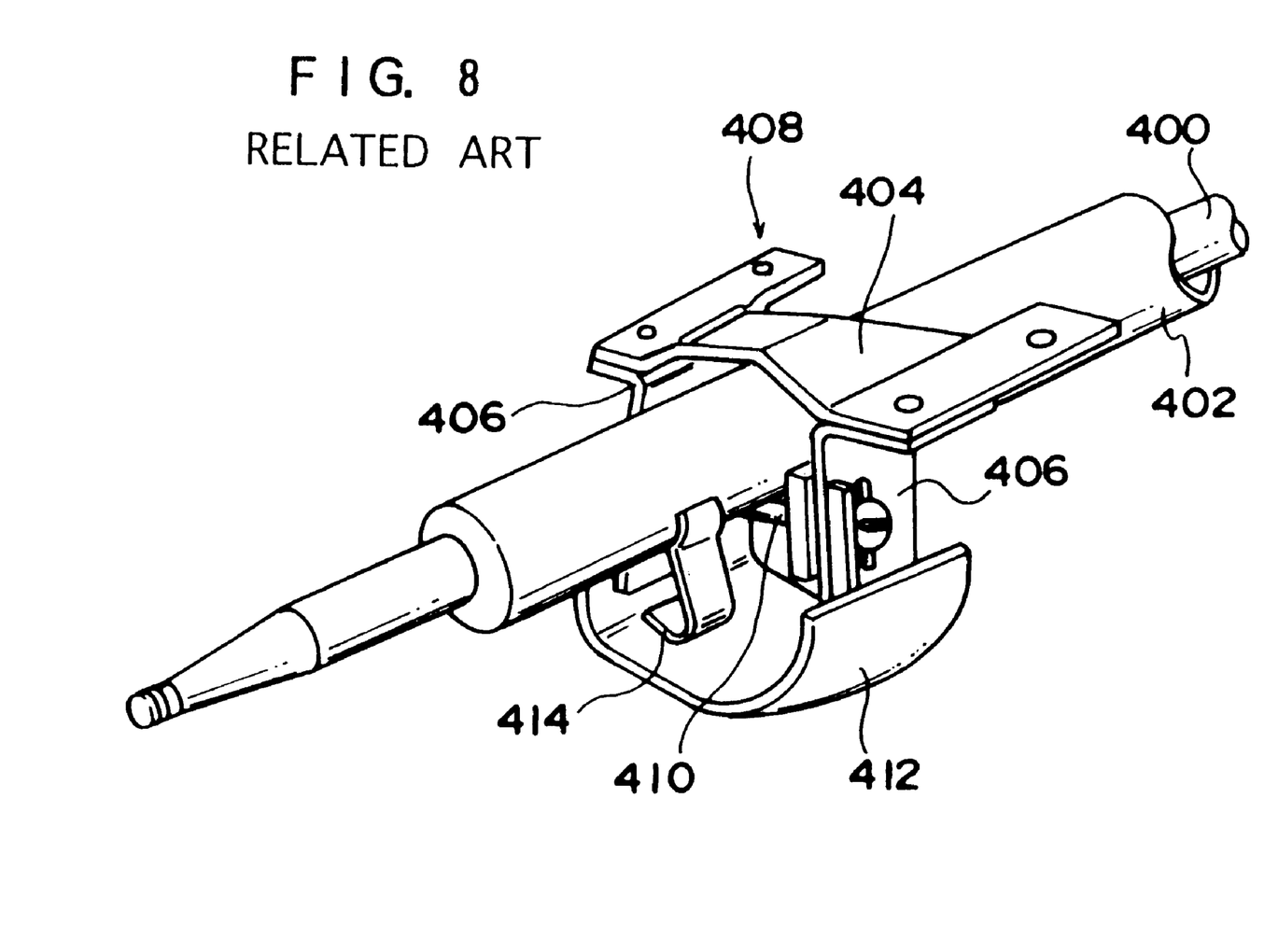
FIG. 8 is a perspective view illustrating a conventional structure.

As illustrated in FIG. 8, in the structure disclosed in this publication, a steering column 402 which covers a steering shaft 400 is supported at a vehicle body by a tilt bracket 408, which is formed from an upper plate member 404 and a pair of side plate members 406, and by a shaft 410, which passes through the side plate members 406 and supports the bottom end of the steering column 402.

A knee protector 412, which is shaped as a substantially circular arc-shaped surface and is elastically deformable, is disposed at the lower side of the tilt bracket 408. The knee protector 412 is elastically supported at the lower side of the steering column 402 via elastically deformable stays 414.

In accordance with the above structure, when an external force of a predetermined value or greater is applied from the front of the vehicle, the vehicle occupant starts to inertially move toward the front of the vehicle, and accordingly, the knees of the vehicle occupant start to inertially move in the same direction while the knees of the vehicle occupant are bent as the starting point of bending. Therefore, if the knee protector 412 were not provided, the driver's knees might contact the tilt bracket 408. However, if the knee protector 412 is disposed beneath the tilt bracket 408 as described above, the driver's knees only contact the knee protector 412.

This structure in which the knee protector 412 is provided is useful as a countermeasure at the time that an external force of a predetermined value or greater is applied from the front of the vehicle. However, countermeasures for protecting the legs of the vehicle occupant can also be studied from other points of view. Further, to provide such countermeasures in the relationship with the legs of the vehicle occupant in a multifaceted manner is important from the standpoint of multiple protection.

The present inventors conceived of the idea of the present invention from this standpoint, conducted various experiments and arrived upon extremely effective countermeasures which control the displacement of a pedal device for a vehicle such as a brake pedal at the time that an external force of a predetermined value or greater is applied from the front of the vehicle, by focusing on the deformation and the displacement behavior of the body panel and the like at the time such an external force is applied.

SUMMARY OF THE INVENTION

In view of the aforementioned, an object of the present invention is to provide a supporting structure of a pedal device for a vehicle which can control the displacement of a stepping surface of a pedal device for a vehicle at the time that an external force of a predetermined value or greater is applied from the front of the vehicle.

To this end, in accordance with a first aspect of the present invention, there is provided a supporting structure of a pedal device for a vehicle, comprising: a pedal bracket fixed to a vehicle body so as to support a rotating shaft portion of a suspended type pedal device for a vehicle; and displacement controlling means coupled to a rear end portion of the pedal bracket so as to control the displacement of a stepping surface of the pedal device for the vehicle as a result of displacement of the displacement controlling means substantially in a downward direction of the vehicle by an external force of a predetermined value or greater which is applied to a front portion of the vehicle.

In accordance with a second aspect of the present invention, in the supporting structure of a pedal device for a vehicle according to the first aspect of the invention, the displacement controlling means is interposed between a vehicle body-side load receiving portion which is displaced substantially in a rearward direction of the vehicle when the external force of the predetermined value or greater is applied to the front portion of the vehicle and a vehicle body-side load supporting portion which is disposed rearwardly of the vehicle body-side load receiving portion and is practically not displaced when the external force is applied to the front portion of the vehicle, and the displacement controlling means includes: a first coupling portion which has high rigidity in its longitudinal direction, has one end portion coupled to the rear end portion of the pedal bracket and another end portion coupled to the vehicle body-side load supporting portion; and a second coupling portion which has high rigidity in its longitudinal direction, has one end portion coupled to the rear end portion of the pedal bracket and another end portion coupled to the vehicle body-side load receiving portion, the another end portion being adapted to approach the another end portion of the first coupling portion when the external force of the predetermined value or greater is applied to the front portion of the vehicle.

In accordance with a third aspect of the present invention, the supporting structure of a pedal device for a vehicle according to the first aspect of the invention further comprises: canceling means provided on the pedal bracket and adapted to cancel a state of coupling between the one end portion of the first coupling portion and the rear end portion of the pedal bracket and a state of coupling between the one end portion of the second coupling portion and the rear end portion of the pedal bracket when the vehicle body-side load receiving portion is displaced by a predetermined amount substantially in the rearward direction of the vehicle.

In accordance with the first aspect of the present invention, when the external force of the predetermined value or greater is applied to the front portion of the vehicle, the displacement controlling means is displaced substantially in the downward direction of the vehicle. For this reason, the rear end portion of the pedal bracket which is coupled to the displacement controlling means is also displaced substantially in the downward direction of the vehicle. Consequently, it is possible to control the displacement of the stepping surface of the pedal device for a vehicle when the external force of the predetermined value or greater is applied to the front portion of the vehicle.

In accordance with the second aspect of the present invention, the displacement controlling means is interposed between the vehicle body-side load receiving portion and the vehicle body-side load supporting portion. When the external force of the predetermined value or greater is applied to the front portion of the vehicle, the vehicle body-side load receiving portion is displaced substantially in the forward direction of the vehicle, but the vehicle body-side load supporting portion is practically not displaced. For this reason, the other end portion of the second coupling portion of the displacement controlling means, which is coupled to the vehicle body-side load receiving portion, is displaced substantially in the rearward direction of the vehicle as a result of the displacement of the vehicle body-side load receiving portion, and approaches the other end portion of the first coupling portion. Here, since the rigidity of both the first coupling portion and the second coupling portion in their longitudinal directions is high, the one end portions of the first coupling portion and the second coupling portion are displaced substantially in the downward direction of the vehicle as the other end portion of the second coupling portion approaches the other end portion of the first coupling portion. For this reason, the rear end portion of the pedal bracket is also displaced substantially in the downward direction of the vehicle. Hence, it is possible to control the displacement of the stepping surface of the pedal device for a vehicle when the external force of the predetermined value or greater is applied to the front portion of the vehicle.

In addition, in accordance with the present invention, since the three members including the vehicle body-side load receiving portion, the pedal bracket, and the vehicle bodyside load supporting portion are coupled together by means of the displacement controlling means which is comprised of the first coupling portion and the second coupling portion, the supporting rigidity of the vehicle body-side load receiving portion can be improved.

Further, in accordance with the present invention, since the supporting rigidity of the vehicle body-side load receiving portion can be improved, an outstanding advantage is offered in that the steering shake during the normal traveling of the vehicle can be suppressed.

In accordance with the third aspect of the present invention, when the vehicle body-side load receiving portion is displaced substantially in the rearward direction of the vehicle by a predetermined amount, the states of coupling between the one end portions of the first coupling portion and the second coupling portion on the one hand, and the rear end portion of the pedal bracket on the other, can be canceled by the canceling means provided on the pedal bracket. For this reason, it is possible to alleviate the load which is inputted to the vehicle body-side load supporting portion via the pedal bracket and the displacement controlling means when the vehicle body-side load receiving portion is displaced substantially in the rearward direction of the vehicle.

The above and other objects, features and advantages of the present invention will become more apparent from the following detailed description of the invention when read in conjunction with the accompanying drawings.

DESCRIPTION OF THE PREFERRED EMBODIMENT

Figure 9:
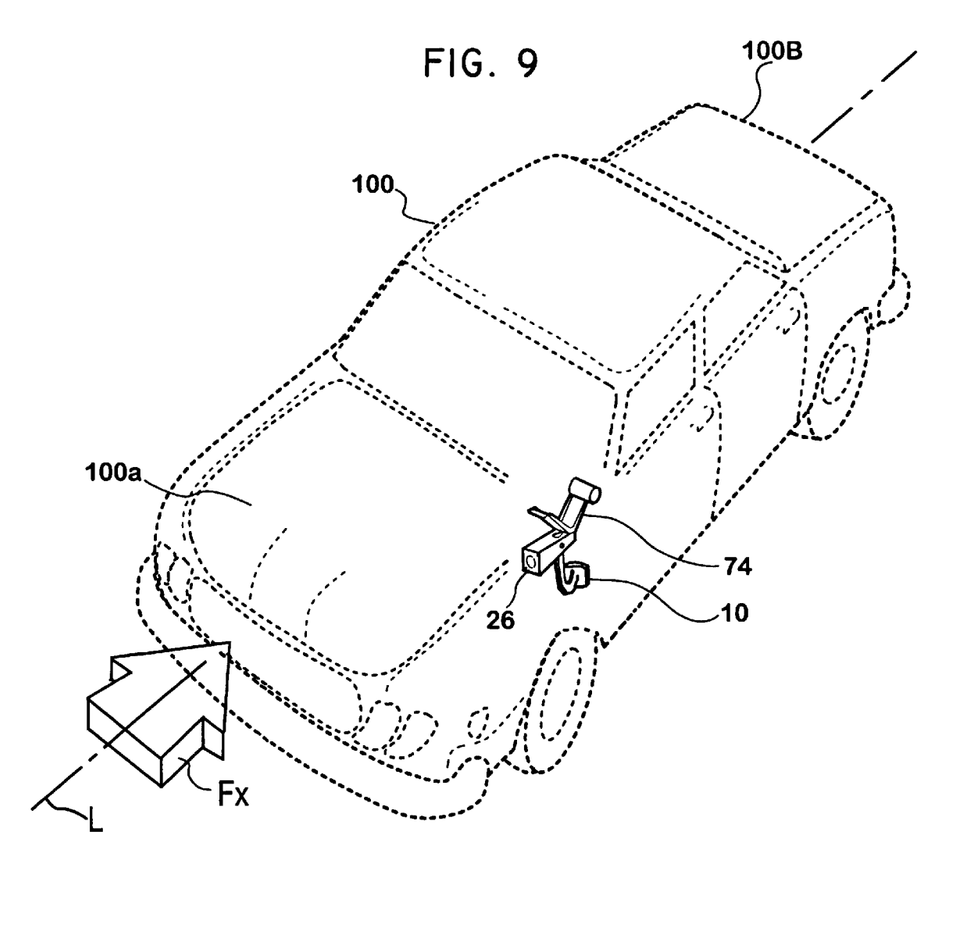
FIG. 9 is a perspective view of the stay and pedal bracket of FIG. 3 installed in a vehicle phantomly drawn.

Referring now to FIGS. 1 through 7, a description will be given of an embodiment of the present invention. In the drawings, arrow UP indicates an upward direction of the vehicle, whereas arrow FRONT indicates a forward direction of a vehicle 100 drawn in phantom in FIG. 9.

Figure 5:
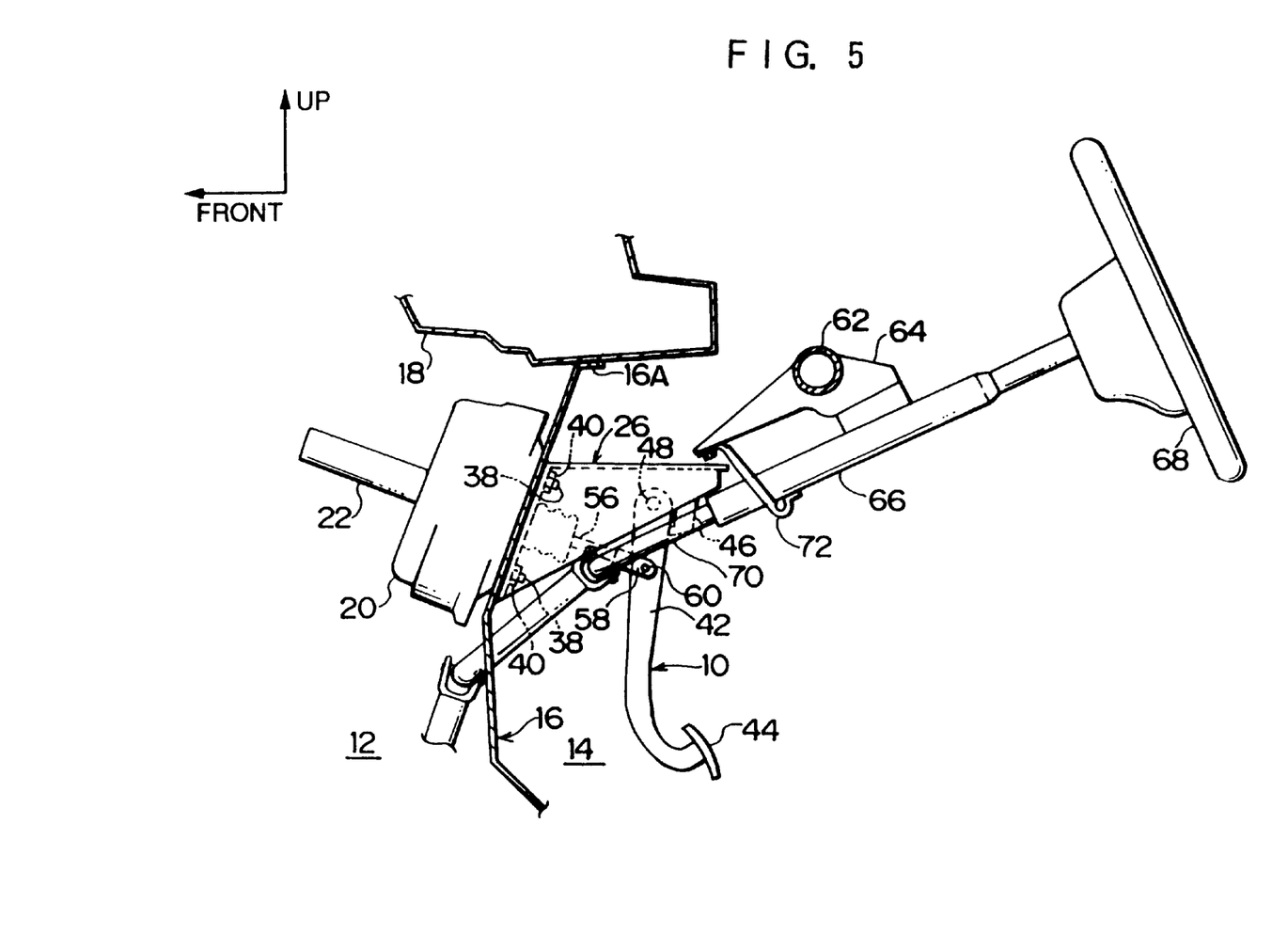
FIG. 5 is a side elevational view illustrating the overall arrangement of the supporting structure of a pedal device for a vehicle in accordance with the embodiment in a state in which the stay is removed from the structure.

The structure of the periphery of a suspended type brake pedal 10 in a state in which a stay 74, which will be described later, is removed is shown in FIG. 5 which is a side view. First, an overall configuration of the structure of the periphery of the brake pedal 10 will be described with reference to this drawing.

A dash panel 16 is disposed substantially vertically at a position which partitions an engine room 12 from a vehicle compartment interior space 14. An upper end portion 16A of the dash panel 16 is secured by spot welding or the like to the rear surface of a cowl inner panel 18 constituting a part of a cowl with its longitudinal direction arranged in the transverse direction of the vehicle 100 (i.e., in a direction perpendicular to the plane of the drawing). Further, a lower end portion of the dash panel 16 is secured to an unillustrated floor panel by spot welding or the like.

A brake booster 20 for boosting the stepping force of a driver which is applied to the brake pedal 10, a master cylinder 22 for converting the pressure boosted by the brake booster 20 to hydraulic pressure, and an unillustrated reservoir tank for storing and replenishing a brake fluid while following a change in the volume of a hydraulic system are integrally disposed on the vehicle front side of the aforementioned dash panel 16.

Figure 3:
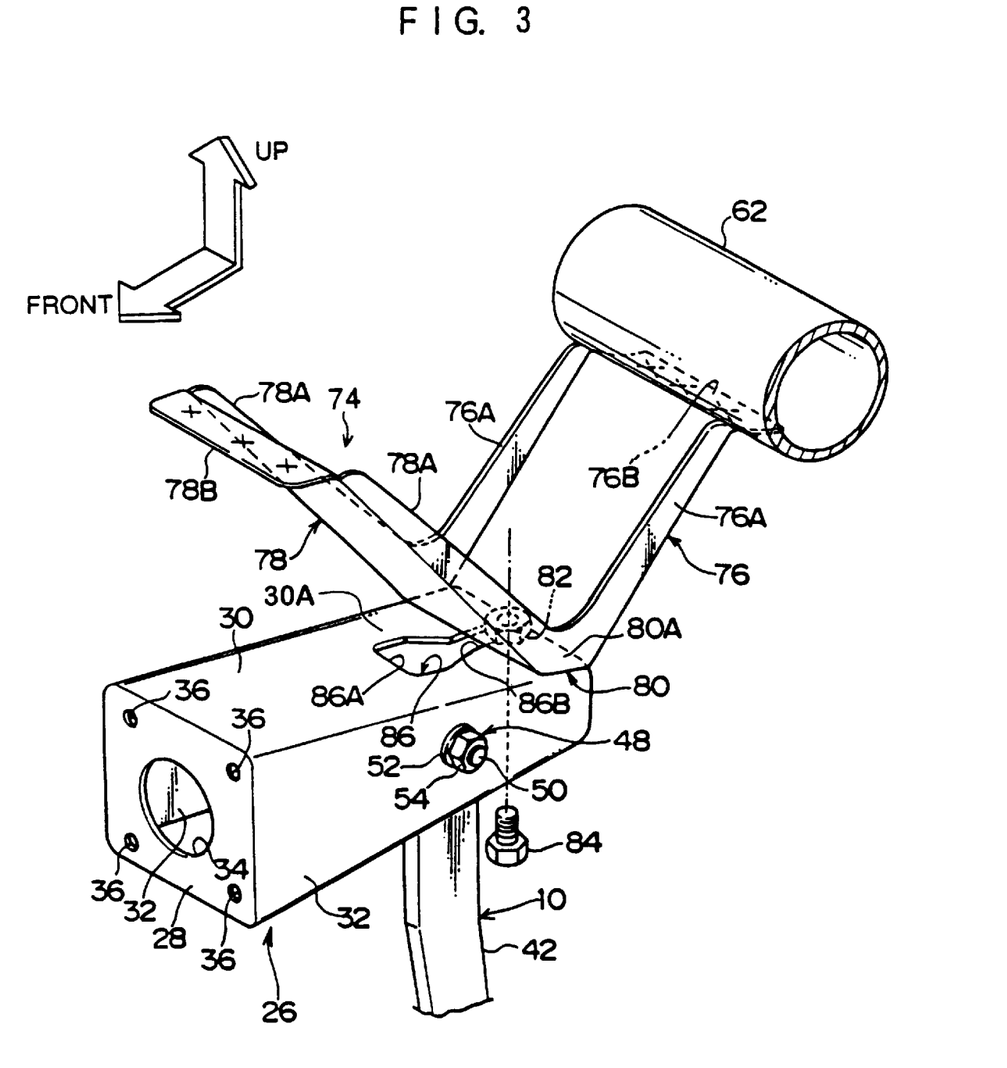
FIG. 3 is an enlarged perspective view mainly illustrating a stay and a pedal bracket which are shown in FIG. 1.
Figure 4:
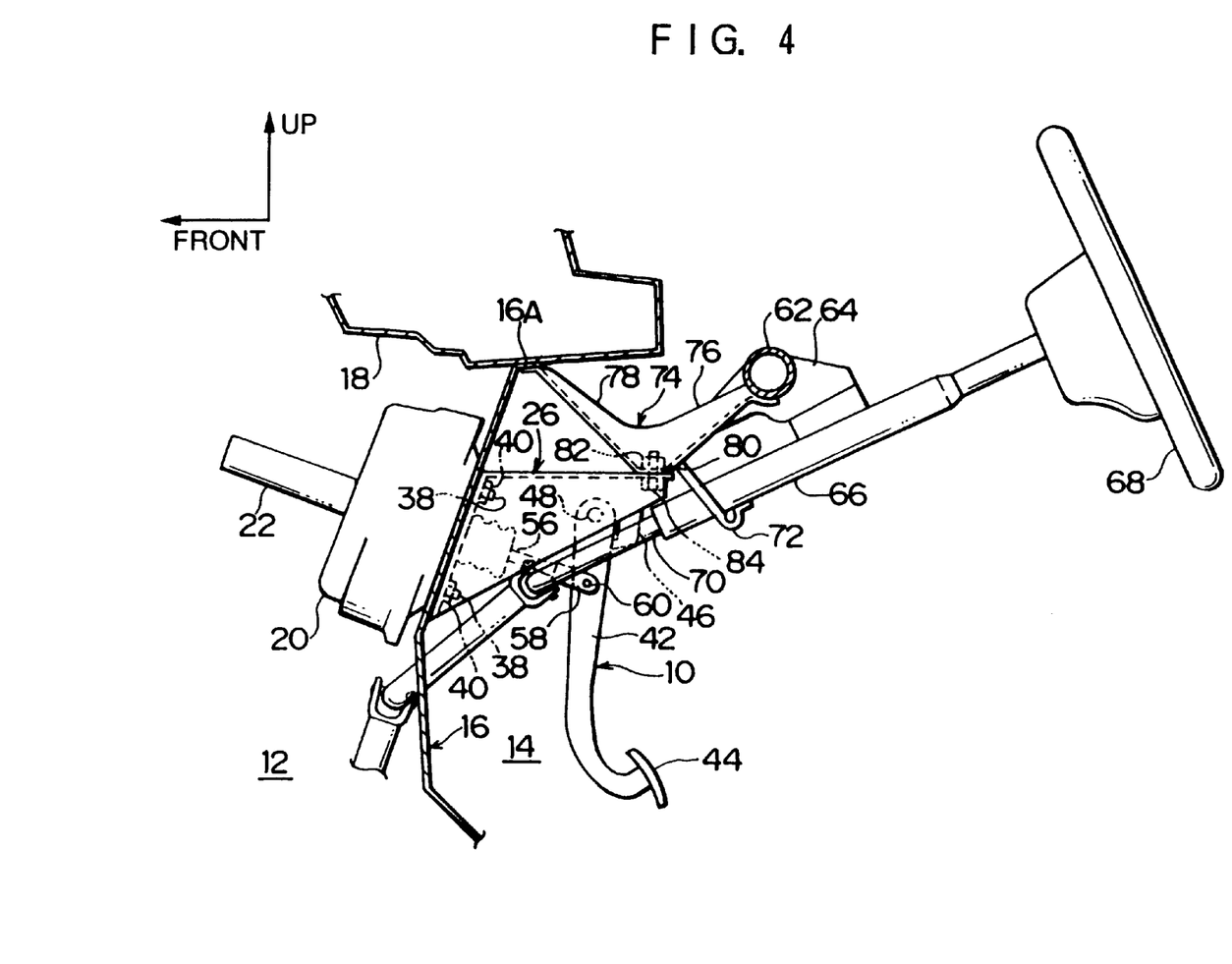
FIG. 4 is a side elevational view illustrating the overall arrangement of the supporting structure of a pedal device for a vehicle in accordance with the embodiment in a state in which the stay is assembled to the structure.

Meanwhile, a pedal bracket 26 for swingably supporting the brake pedal 10 is disposed on the vehicle rear side of the dash panel 16. As also shown in FIG. 3, the pedal bracket 26 is comprised of a base plate portion 28 constituting a surface for mounting on the dash panel 16, a top plate portion 30 extending horizontally from an upper end of the base plate portion 28 substantially toward the rear of the vehicle, and a pair of side plate portions 32 extending parallel to each other from opposite sides of the base plate portion 28 (i.e., from its opposite ends in the transverse direction of the vehicle) substantially toward the rear of the vehicle. Therefore, the pedal bracket 26 as a whole is formed with a substantially U-shaped cross section such that it is elongated substantially in the longitudinal direction "L" (FIG. 9) of the vehicle 100, and its bottom side is open. Incidentally, although the pedal bracket 26 is formed integrally by appropriately bending a plate, an arrangement may be provided such that various portions are formed from separate parts and are formed integrally by welding or the like.

A through hole 34 of a predetermined diameter is formed in a central portion of the base plate portion 28, and bolt insertion holes 36 are respectively formed in the vicinities of the four corners of the base plate portion 28. Then, in a state in which the base plate portion 28 is abutted against the dash panel 16 (in this drawing, a dash insulator serving as a sound insulator which is attached to the dash panel 16 is not shown), stud bolts 38 projecting from the brake booster 20 are relatively inserted into the bolt insertion holes 36 in the base plate portion 28, and nuts 40 are respectively engaged threadedly on the stud bolts 38 from the vehicle rear side surface of the base plate portion 28, thereby fixing the front end side of the pedal bracket 26 to the dash panel 16. As an alternative method of fixing, the weld nuts may be welded in advance to the vehicle front side surface of the dash panel 16, and mounting bolts may be screwed into the weld nuts from the base plate portion 28 side. Incidentally, the structure for fixing the rear end side of the pedal bracket 26 will be described later.

The brake pedal 10 is interposed between the pair of side plate portions 32 of the above-described pedal bracket 26. The brake pedal 10 is comprised of a pedal supporting portion 42 formed by appropriately bending a narrow plate material and a pedal pad 44 which is provided at a lower end of the pedal supporting portion 42 and to which the stepping force of the driver is imparted. It should be noted that an unillustrated return spring is retained at the pedal supporting portion 42 of the brake pedal 10, thereby constantly urging the brake pedal 10 in a direction in which the brake pedal 10 returns to its initial position. Correspondingly, a hook-shaped pedal stopper 46 is fixed to the side plate portions 32 of the pedal bracket 26, and a bent distal end portion of the pedal stopper 46 is arranged to abut against a rear surface of the pedal supporting portion 42. Therefore, when the brake pedal is not operated, the rear surface of the pedal supporting portion 42 is made to abut against the distal end portion of the pedal stopper 46 by the urging force of the return spring, thereby maintaining the brake pedal 10 in its initial position.

A rotating shaft portion 48 is provided at an upper end portion of the brake pedal 10, and is pivotally supported by the pair of side plate portions 32 of the pedal bracket 26. To give a brief description of an example of the configuration of the rotating shaft portion 48, the rotating shaft portion 48 is arranged as follows. A substantially tubular pedal boss is inserted into a through hole formed in an upper end portion of the pedal supporting portion 42, and hollow cylindrical bushes are respectively fitted over both end portions of the pedal boss. After tubular collars are fitted in the bushes, a mounting bolt 50 (see FIG. 3) is inserted from the outer side of one side plate portion 32, while a nut 54 is threadedly engaged with the mounting bolt 50 from the outer side of the other side plate portion 32 via a washer 52.

Meanwhile, a distal end portion of a push rod (i.e., an operating rod) 56, which projects from the brake booster 20 penetrates through the dash panel 16, is connected to an intermediate portion of the pedal supporting portion 42 of the brake pedal 10 in such a manner as to be relatively rotatable. Specifically, a clevis 58, which is U-shaped in plan view, is attached to the distal end portion of the push rod 56, and the intermediate portion of the pedal supporting portion 42 is positioned between two side portions of the clevis 58 in an inserted state. In this state, a clevis pin 60 is passed through the two side portions of the clevis 58 and the pedal supporting portion 42, and an E-ring, a β-pin or the like is provided on its penetrated end portion to retain the clevis pin 60 in position.

A pipe-shaped instrument panel reinforcement 62 is provided at a position diagonally above the above-described pedal bracket 26 in the rearward direction of the vehicle in such a manner as to extend along the transverse direction of the vehicle. It should be noted that this instrument panel reinforcement 62 is a high-strength member. A steering column support 64, which is substantially L-shaped in side view, is welded at a predetermined position on the instrument panel reinforcement 62, and a column tube 66 is supported at a vehicle rear lower end of the steering column support 64. Incidentally, a steering shaft 70 which is coupled to a steering wheel 68 is inserted in the column tube 66. In addition, an upper end portion of a bending bracket 72 is fixed to a vehicle forward distal end portion of the steering column support 64. A lower end portion of the bending bracket 72 is welded to a forward lower end side of the column tube 66, and at the time that an external force of a predetermined value or greater is applied from the front of the vehicle, the bending bracket 72 is adapted to absorb energy by undergoing bending deformation due to a secondary load inputted from the steering wheel 68.

Here, as shown in FIGS. 1 through 4, the stay 74, which is substantially V-shaped in side view, is interposed between a vehicle body-side load receiving portion in a form of the upper end portion 16A of the above-described dash panel 16 and a vehicle body-side load supporting portion in a form of the instrument panel reinforcement 62 as described in detail below, a skilled artisan would appreciate that the stay 74 is a displacement control device for controlling displacement of the brake pedal 10. As shown in FIG. 3, the stay 74 is comprised of a first coupling portion 76 extending substantially diagonally upward in the rearward direction of the vehicle from a vehicle rear end portion 30A of the top plate portion 30 of the pedal bracket 26, a second coupling portion 78 extending substantially diagonally upward in the forward direction of the vehicle from the vehicle rear end portion 30A of the top plate portion 30, and a narrow and flat connecting portion 80 for connecting the first coupling portion 76 and the second coupling portion 78. It should be noted that the stay 74 is formed by appropriately bending a plate material.

Flange portions 76A, 78A, and 80A, which are bent upward so as to be parallel to each other, are formed at the respective transverse sides of the first coupling portion 76, the second coupling portion 78, and the connecting portion 80. Since these flange portions 76A, 78A, and 80A are provided, the cross-sectional shape of each portion becomes substantially U-shaped, with the result that the first coupling portion 76 and the second coupling portion 78 are made highly rigid with respect to their longitudinal direction.

Further, a rear end portion 76B of the first coupling portion 76 is bent substantially toward the rear of the vehicle, and that rear end portion 76B is fixed to a peripheral surface of the lower side of the instrument panel reinforcement 62 by spot welding. Similarly, a front end portion 78B of the second coupling portion 78 is bent substantially toward the front of the vehicle, and that front end portion 78B is fixed to the upper end portion 16A of the dash panel 16 and to the rear surface side of the cowl inner panel 18 by spot welding. Incidentally, the three members may be fixed by fastening members such as bolts and nuts. Further, a weld nut 82 serving as a fastening member is welded in advance to a top surface of the connecting portion 80 of the stay 74, and a fixing bolt 84 serving as a fastening member is threadedly engaged with the weld nut 82 from the lower side of the pedal bracket 26, thereby fixing the connecting portion 80 of the stay 74 to a rear end portion of the top plate portion 30 of the pedal bracket 26. Parenthetically speaking, the rear end portion 76B of the first coupling portion 76 corresponds to another end portion of the first coupling portion, the front end portion 78B of the second coupling portion 78 corresponds to another end portion of the second coupling portion, and the connecting portion 80 corresponds to an end portion of the first coupling portion and an end portion of the second coupling portion.

Further, a slit 86 is formed in the vehicle rear end portion 30A of the top plate portion 30, and the slit 86 is comprised of a wide portion 86A whose opening is wider than the head of the fixing bolt 84 and a narrow portion 86B which is wider than the shank portion of the fixing bolt 84 but narrower than the head of the fixing bolt 84. The connecting portion 80 of the stay 74 is fixed at the narrow portion 86B of the slit 86 by means of the fixing bolt 84 and the weld nut 82.

Next, a description will be given of the operation and advantages of this embodiment.

Figure 1:
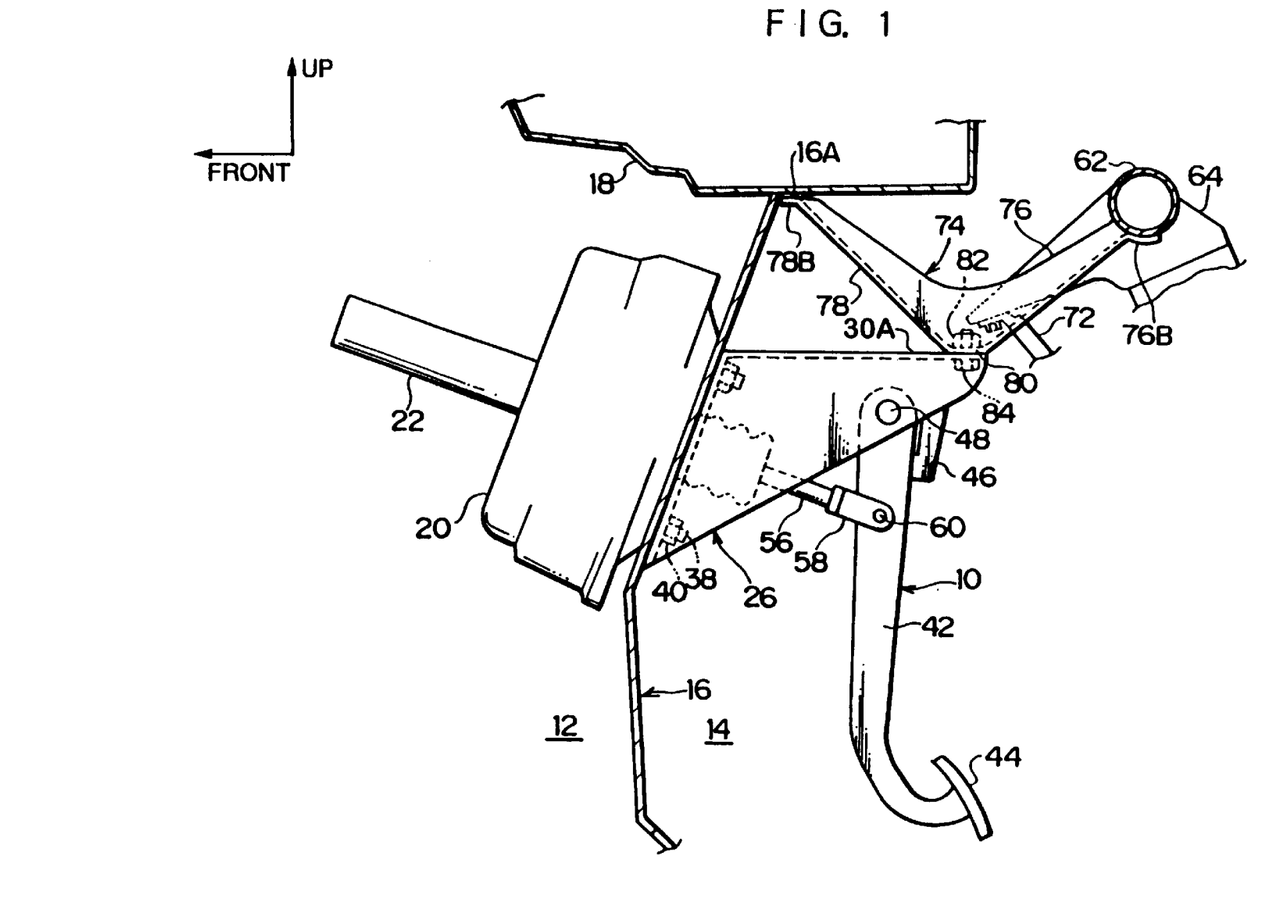
FIG. 1 is an enlarged side elevational view of essential portions of a supporting structure of a pedal device for a vehicle in accordance with an embodiment of the present invention.

As shown in FIG. 1, when the brake pedal is not operated, the brake pedal 10 is held at its initial position by the urging force of the return spring and the pedal stopper 46. In this state, if the driver steps down on the pedal pad 44 of the brake pedal 10, the brake pedal is swung about the rotating shaft portion 48 substantially toward the front portion of the vehicle, and the push rod 56 is pressed in the same direction. As a result, the stepping force applied to the pedal pad 44 by the driver is boosted by the brake booster 20.

Figure 2:
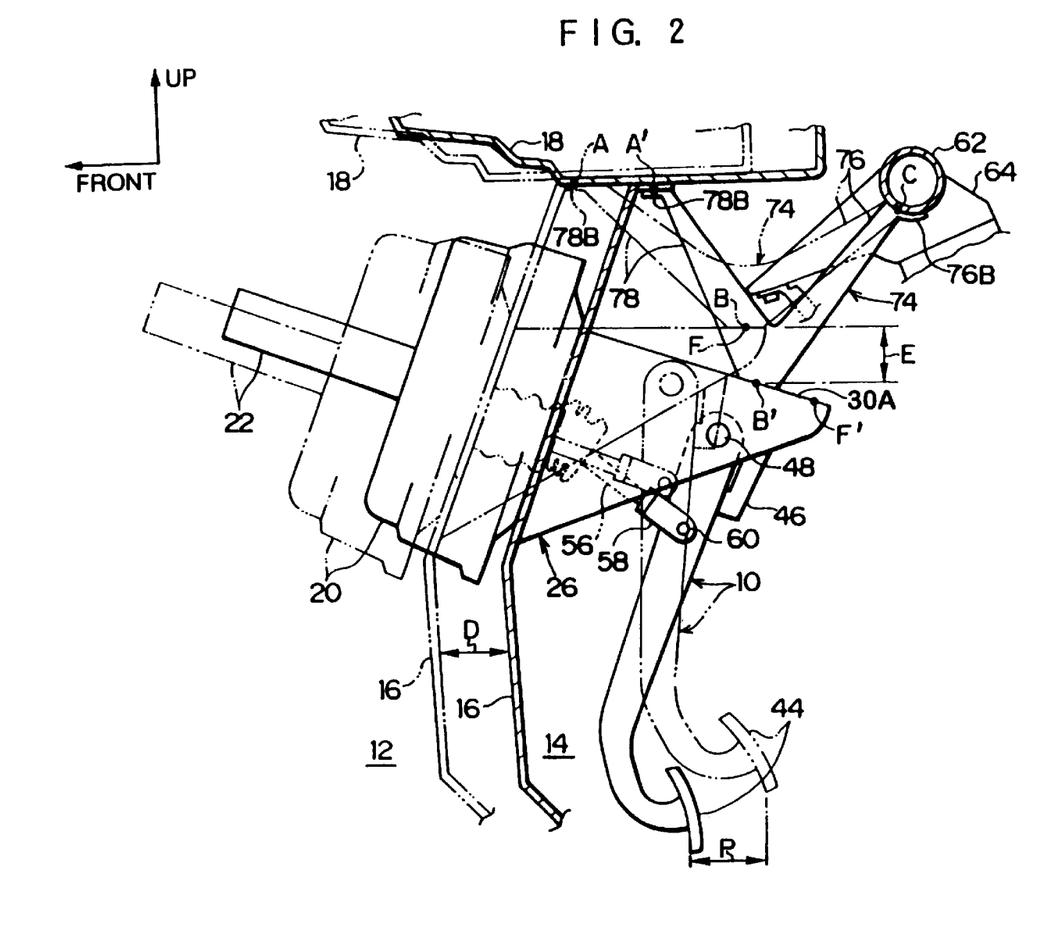
FIG. 2 is a side elevational view illustrating states before and after the application of an external force of a predetermined value or greater in the structure shown in FIG. 1.

Meanwhile, at the time that an external force (arrow $F_x$ in FIG. 9) of a predetermined value or greater is applied from a front portion 100A of the vehicle towards a rear portion 100B (FIG. 9) of the vehicle, the load occurring at that time is inputted to the dash panel 16 and the cowl inner panel 18. For this reason, as shown in FIG. 2, the dash panel 16 and the cowl inner panel 18 are displaced by a predetermined amount (the amount of displacement at this time is indicated by D) substantially toward the rear of the vehicle. Consequently, the position of the front end portion 78B of the second coupling portion 78 of the stay 74 is also displaced from A to A'. However, since the instrument panel reinforcement 62 is a high-rigidity member, the instrument panel reinforcement 62 is practically not displaced toward the rear of the vehicle, so that the position of the rear end portion 76B of the first coupling portion 76 of the stay 74 remains unchanged at C. For this reason, the front end portion 78B of the second coupling portion 78 of the stay 74 approaches the rear end portion 76B of the first coupling portion 76. Here, since the longitudinal rigidity of each of the first coupling portion 76 and the second coupling portion 78 is set to be high, the first coupling portion 76 and the second coupling portion 78 do not buckle in the longitudinal direction. Therefore, since the front end portion 78B of the second coupling portion 78 approaches the rear end portion 76B of the first coupling portion 76, the coupling position between the connecting portion 80 of the stay 74 and the rear end portion of the pedal bracket 26 is displaced from F to F'.

In this embodiment, however, since the slit 86 of the predetermined configuration is formed in the rear end portion 30A of the top plate portion 30 of the pedal bracket 26 as described above, in the process in which the pedal bracket 26 undergoes displacement substantially toward the rear of the vehicle, the fixing bolt 84, which connects the rear end portion of the pedal bracket 26 and the connecting portion 80 of the stay 74, relatively slides toward the wide portion 86A of the slit 86, and becomes disengaged from the wide portion 86A. Hence, the coupling position between the connecting portion 80 of the stay 74 and the rear end portion of the pedal bracket 26 is consequently displaced from B to B'.

Through the above-described operation, the rear end portion of the pedal bracket 26 is displaced substantially in a downward direction of the vehicle by an amount of displacement E (i.e., the rear end portion 30A of the pedal bracket 26 is pressed substantially in the downward direction of the vehicle), so that the pedal bracket 26 rotates substantially in the downward direction of the vehicle. As a consequence, a rotating force acting substantially toward the front of the vehicle is imparted to the brake pedal 10 about the rotating shaft portion 48, so that the pedal pad 44 is displaced substantially toward the front of the vehicle.

Figure 6:
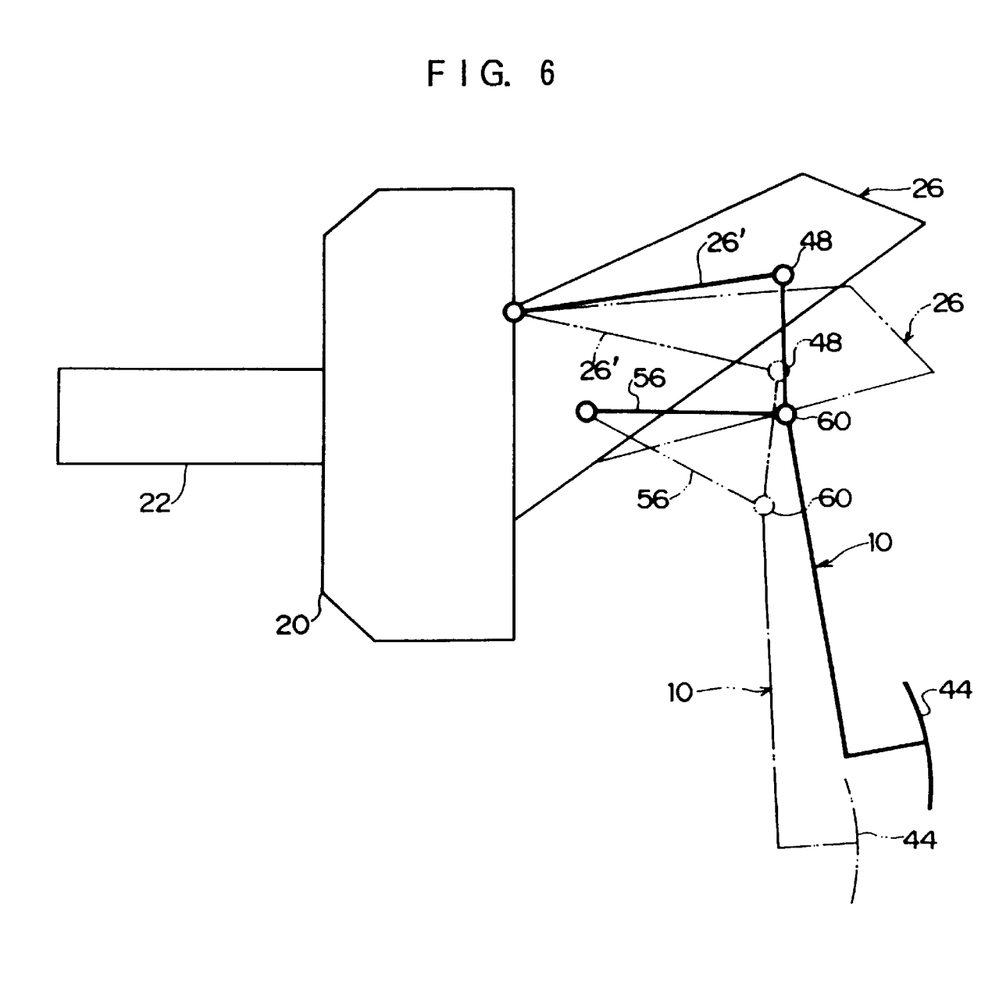
FIG. 6 is a schematic diagram illustrating an operating mechanism of the embodiment in a case where a pedal stopper is not provided.
Figure 7:
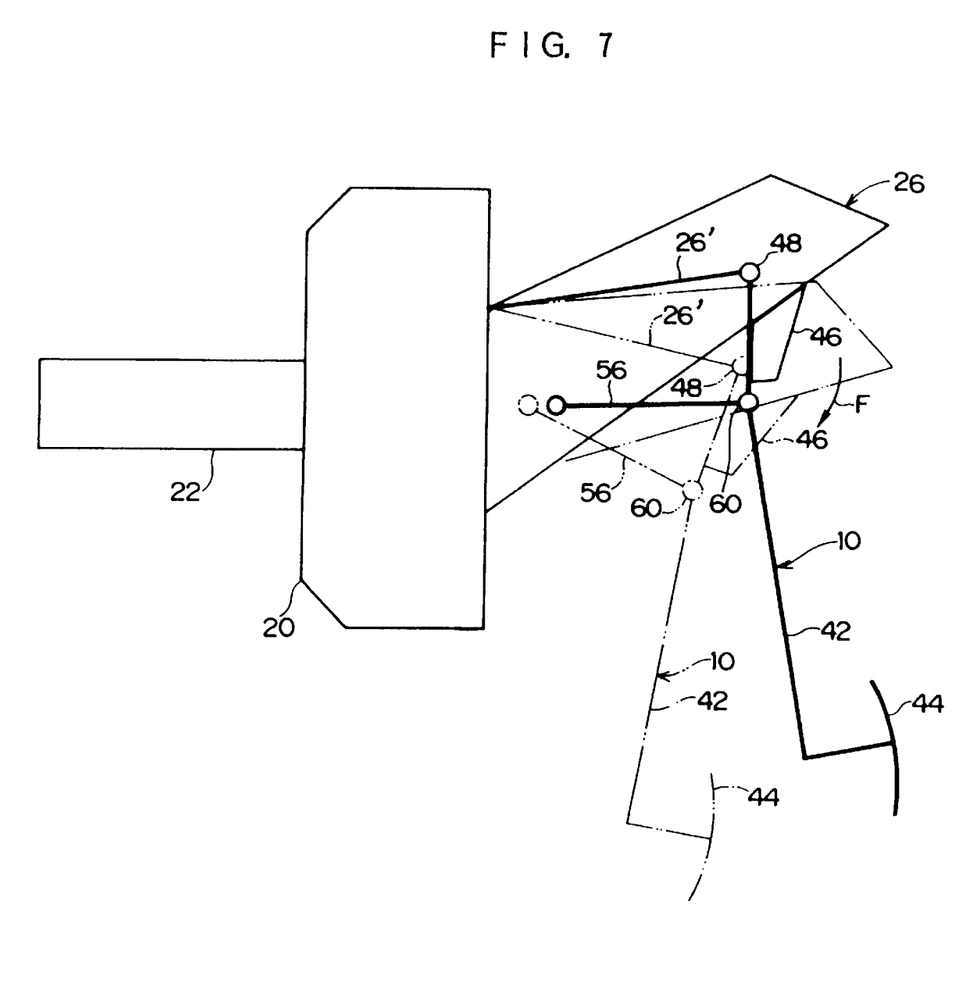
FIG. 7 is a schematic diagram illustrating the operating mechanism of the embodiment in a case where the pedal stopper is provided.

Further, at the time the rear end portion of the pedal bracket 26 is thus pressed substantially in the downward direction of the vehicle, the rear surface of the pedal supporting portion 42 is pressed substantially toward the front of the vehicle by the distal end portion of the pedal stopper 46. For this reason, the rotating force about the rotating shaft portion 48 substantially toward the front of the vehicle, which is imparted to the brake pedal 10, is boosted, and the pedal pad 44 is further displaced substantially toward the front of the vehicle (the amount of displacement at this time is indicated by P). It should be noted that FIGS. 6 and 7 show schematic diagrams illustrating the above-described process. It can be appreciated from these drawings that the amount of displacement of the pedal pad 44 oriented substantially toward the front of the vehicle is greater in the case of the structure wherein it is possible to obtain a rotating force F substantially toward the front of the vehicle by means of the pedal stopper 46 (i.e., in the case of FIG. 7) than in the case of the structure wherein it is not possible to obtain the rotating force F substantially toward the front of the vehicle by means of the pedal stopper 46 (i.e., in the case of FIG. 6). Incidentally, the line which is indicated by reference numeral 26' in the drawings means a link in a case where the pedal bracket 26 is regarded as a pseudo-link.

Thus, in this embodiment, the arrangement provided is such that the stay 74, which is comprised of the first coupling portion 76, the second coupling portion 78, and the connecting portion 80 and is formed substantially in a V-shape in side view, is additionally provided. Further, the rear end portion 76B of the first coupling portion 76 is fixed to the instrument panel reinforcement 62, the front end portion 78B of the second coupling portion 78 is fixed to the coupling portion between the upper end portion 16A of the dash panel 16 and the cowl inner panel 18, and the connecting portion is fixed to the rear end portion of the pedal bracket 26 by means of the fixing bolt 84 and the weld nut 82. Accordingly, when an external force of a predetermined value or greater is applied from the front portion 100A (FIG. 9) of the vehicle, the rear end portion of the pedal bracket 26 can be displaced substantially in the downward direction of the vehicle. Consequently, the pedal pad 44 can be displaced substantially toward the front of the vehicle. In other words, in accordance with this embodiment, when an external force of a predetermined value or greater is applied from the front of the vehicle, the V-shaped stay 74 is deformed such that its included angle becomes narrow so as to displace the rear end portion of the pedal bracket 26 substantially in the downward direction of the vehicle. Hence, control can be provided such that pedal pad 44 of the brake pedal 10 is displaced substantially toward the front of the vehicle. As a result, it is possible to suppress the bending of the driver's knees due to the inertial movement of the driver when an external force of a predetermined value or greater is applied from the front of the vehicle. In its turn, it is possible to keep the driver's knees away from the steering column.

Further, in this embodiment, since the arrangement provided is such that the substantially hook-shaped pedal stopper 46 is provided on the pedal bracket 26, and the rear surface of the pedal supporting portion 42 is pressed substantially toward the front of the vehicle by the distal end portion of the pedal stopper 46 when the rear end portion of the pedal bracket 26 is pressed substantially in the downward direction of the vehicle, it is possible to boost the rotating force about the rotating shaft portion 48 substantially toward the front of the vehicle, which is imparted to the brake pedal 10. Accordingly, the pedal pad 44 can be displaced further substantially toward the front of the vehicle when the external force of the predetermined value or greater is applied from the front portion 100A of the vehicle 100.

In addition, in this embodiment, since the three members including the dash panel 16 (and the cowl inner panel 18), the pedal bracket 26, and the instrument panel reinforcement 62 are coupled together by means of the stay 74 as described above, the supporting rigidity of the instrument panel reinforcement 62 can be improved. Hence, the steering shake during the normal traveling of the vehicle can be suppressed.

Further, in this embodiment, since the slit 86 which is comprised of the wide portion 86A and the narrow portion 86B is formed in the rear end portion of the top plate portion 30 of the pedal bracket 26, it is possible to cancel the state of coupling between the rear end portion of the pedal bracket 26 and the connecting portion 80 of the stay 74 in the process in which the pedal bracket 26 is displaced substantially toward the rear of the vehicle thus, the coupling between the rear end portion of the pedal bracket 26 and the connecting portion 80 of the stay 74 forms a canceling device in that the coupling therebetween can be disengaged. For this reason, it is possible to reduce the load inputted to the instrument panel reinforcement 62 via the pedal bracket 26 and the stay 74, thereby making it possible to prevent a relatively large load from being inputted to the instrument panel reinforcement 62.

Figure 10:
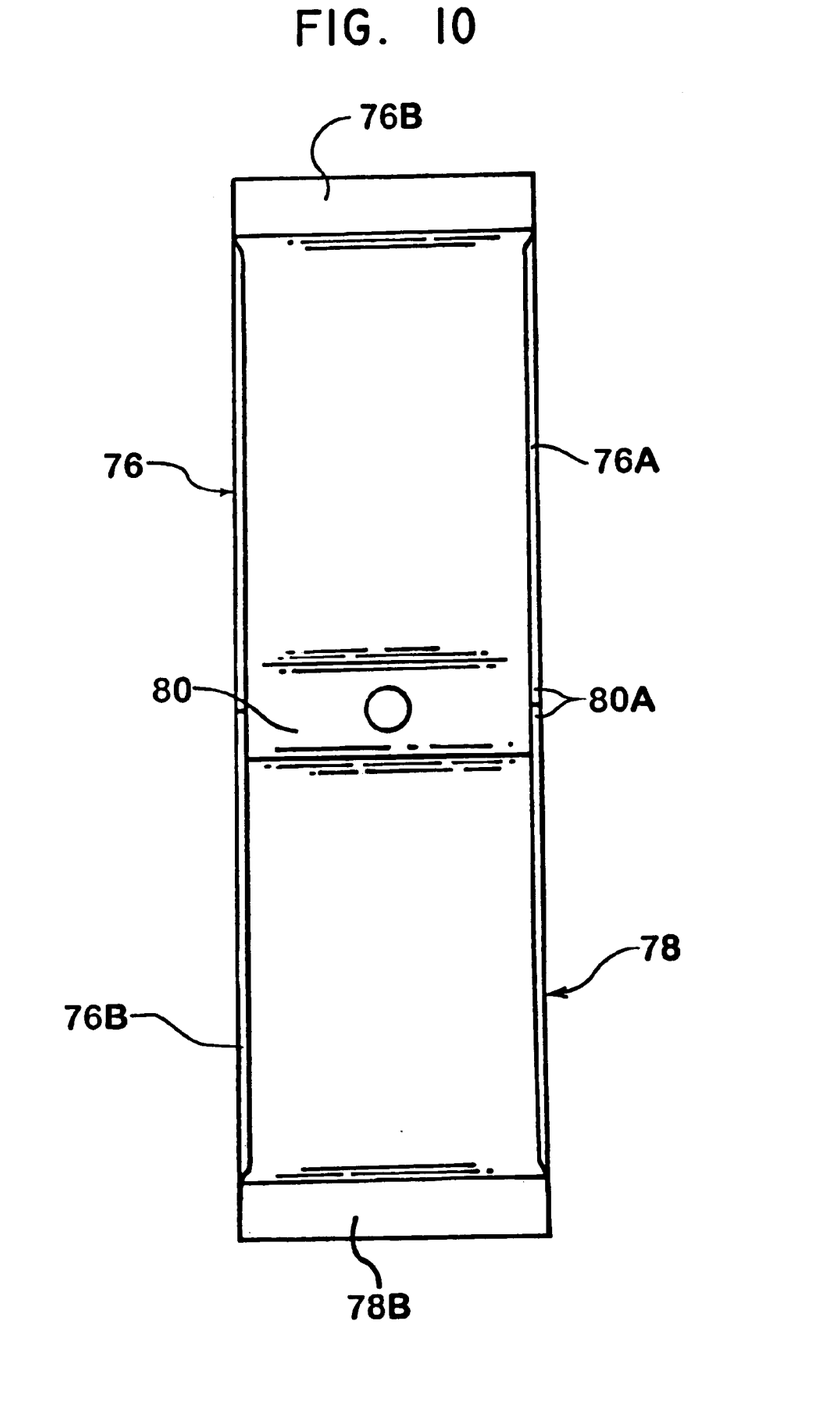
FIG. 10 is plan view of another exemplary embodiment of a stay in accordance with the invention.

Although, in this embodiment, the stay 74 is formed by a single component part, as shown in FIG. 10, the present invention is not limited to the same, and an arrangement may be provided such that the stay 74 is split into a portion corresponding to the first coupling portion 76 and a portion corresponding to the second coupling portion 78. In this case, it suffices if a lower end portion of the portion corresponding to the first coupling portion 76 and a lower end portion of the portion corresponding to the second coupling portion 78 are superposed together, and are fixed to the rear end portion of the pedal bracket 26 in this state by using fastening members such as a bolt and a nut.

Although, in this embodiment, a description has been given of the case where the present invention is applied to a main brake pedal of a suspended type, the present invention may be applied to other types of pedals, such as a suspended type clutch pedal and a suspended type parking brake pedal.

What is claimed is:

1. A supporting structure of a pedal device for a vehicle, the supporting structure comprising:
    a pedal bracket fixed to the vehicle so as to support a rotating shaft portion of the pedal device for the vehicle;
    displacement controlling means coupled to a rear end portion of said pedal bracket so as to control the displacement of a stepping surface of the pedal device for the vehicle as a result of displacement of said displacement controlling means and the rear end portion of said pedal bracket in a downwardly direction of the vehicle by an external force of a predetermined value or greater which is applied to a front portion of the vehicle towards a rear portion of the vehicle, wherein said displacement controlling means is interposed between a vehicle body-side load receiving portion which is displaced substantially in a rearwardly direction of the vehicle when the external force of the predetermined value or greater is applied to the front portion of the vehicle and a vehicle body-side load supporting portion which is disposed rearwardly of said vehicle body-side load receiving portion and is practically not displaced when the external force is applied to the front portion of the vehicle, and said displacement controlling means includes:
    a first coupling portion which is rigid in its longitudinal direction, has one end portion coupled to the rear end portion of said pedal bracket and another end portion coupled to said vehicle body-side load supporting portion; and
    a second coupling portion which is rigid in its longitudinal direction, has one end portion coupled to the rear end portion of said pedal bracket and another end portion coupled to said vehicle body-side load receiving portion, said another end portion being adapted to approach the another end portion of said first coupling portion when the external force of the predetermined value or greater is applied to the front portion of the vehicle.

2. A supporting structure according to claim 1, further comprising:
    canceling means provided on said pedal bracket and adapted to cancel a state of coupling between said one end portion of said first coupling portion and the rear end portion of said pedal bracket and a state of coupling between said one end portion of said second coupling portion and the rear end portion of said pedal bracket when said vehicle body-side load receiving portion is displaced by a predetermined amount substantially in the rearward direction of the vehicle.

3. A supporting structure according to claim 2, wherein said canceling means is a slit having a wide portion and a narrow portion, and said one end portion of said first coupling portion and said one end portion of said second coupling portion are coupled to said pedal bracket at the narrow portion.

4. A supporting structure according to claim 1, wherein said first coupling portion and said second coupling portion have flange portions along their longitudinal directions, and said flange portions increase the rigidity of said first coupling portion and said second coupling portion in the respective longitudinal directions.

5. A supporting structure according to claim 1, further comprising:
    a fastening member for coupling said one end portion of said first coupling portion and said one end portion of said second coupling portion to the rear end portion of said pedal bracket.

6. A supporting structure according to claim 1, wherein said first coupling portion and said second coupling portion are provided integrally.

7. A supporting structure according to claim 1, wherein said first coupling portion and said second coupling portion are provided separately.

8. A supporting structure according to claim 1, wherein said first coupling portion and said second coupling portion are provided in a V-shape in side view.

9. A supporting structure according to claim 1, further comprising:
a pedal stopper provided on said pedal bracket, adapted to hold the pedal device in its initial position as said pedal stopper abuts against the pedal device when the pedal device is in a non-operated state, and adapted to press the pedal device substantially in the forwardly direction of the vehicle in accordance with the movement of said displacement controlling means and said pedal bracket when the external force of the predetermined value or greater is applied to the front portion of the vehicle.

10. A supporting structure of a suspended type pedal device for a vehicle, comprising:
a pedal bracket fixed to the vehicle so as to support a rotating shaft portion of the suspended type pedal device for the vehicle;
displacement controlling means coupled to a rear end portion of said pedal bracket so as to control the displacement of a stepping surface of the suspended type pedal device for the vehicle as a result of displacement of said displacement controlling means and the rear end portion of said pedal bracket substantially in a downwardly direction of the vehicle by an external force of a predetermined value or greater which is applied to a front portion of the vehicle towards a rear portion of the vehicle, said displacement controlling means being interposed between a vehicle body-side load receiving portion which is displaced in a rearwardly direction of the vehicle when the external force of the predetermined value or greater is applied to the front portion of the vehicle and a vehicle body-side load supporting portion which is disposed rearwardly of said vehicle body-side load receiving portion and is practically not displaced when the external force is applied to the front portion of the vehicle, said displacement controlling means including a first coupling portion which has a buckling-resistant rigidity in its longitudinal direction, has one end portion coupled to the rear end portion of said pedal bracket and another end portion coupled to said vehicle body-side load supporting portion, and a second coupling portion which has a buckling-resistant rigidity substantially identical to the buckling-resistant rigidity of the first coupling portion, in its longitudinal direction, has one end portion coupled to the rear end portion of said pedal bracket and another end portion coupled to said vehicle body-side load receiving portion, said another end portion being adapted to approach the another end portion of said first coupling portion when the external force of the predetermined value or greater is applied to the front portion of the vehicle; and
canceling means provided on said pedal bracket and adapted to cancel a state of coupling between said one end portion of said first coupling portion and the rear end portion of said pedal bracket and a state of coupling between said one end portion of said second coupling portion and the rear end portion of said pedal bracket when said vehicle body-side load receiving portion is displaced by a predetermined amount in the rearwardly direction of the vehicle.

11. A supporting structure according to claim 10, further comprising:
a fastening member for coupling said one end portion of said first coupling portion and said one end portion of said second coupling portion to the rear end portion of said pedal bracket.

12. A supporting structure according to claim 11, wherein said canceling means is a slit having a wide portion and a narrow portion, and said one end portion of said first coupling portion and said one end portion of said second coupling portion are coupled to said pedal bracket at the narrow portion by said fastening member.

13. A supporting structure according to claim 10, wherein said first coupling portion and said second coupling portion have flange portions along their longitudinal directions, and said flange portions increase the rigidity of said first coupling portion and said second coupling portion in the respective longitudinal direction.

14. A supporting structure according to claim 10, wherein said first coupling portion and said second coupling portion are provided integrally.

15. A supporting structure according to claim 10, wherein said first coupling portion and said second coupling portion are provided separately.

16. A supporting structure according to claim 10, wherein said first coupling portion and said second coupling portion are provided substantially in a V-shape in side view.

17. A supporting structure according to claim 10, further comprising:
a pedal stopper provided on said pedal bracket, adapted to hold the suspended type pedal device in its initial position as said pedal stopper abuts against the suspended type pedal device when the suspended type pedal device is in a non-operated state, and adapted to press the suspended type pedal device substantially in the forwardly direction of the vehicle in accordance with the movement of said first coupling portion, said second coupling portion, said displacement controlling means and said pedal bracket when the external force of the predetermined value or greater is applied to the front portion of the vehicle.

* * * * *